United States Patent
Kaufman

[15] 3,679,000
[45] July 25, 1972

[54] SECONDARY OIL RECOVERY METHOD USING N-SULFOHYDROCARBON-SUBSTITUTED ACRYLAMIDE POLYMERS AS VISCOSITY INCREASING AGENTS

[72] Inventor: Paul Richard Kaufman, Parkersburg, W. Va.

[73] Assignee: The Lubrizol Corporation, Wickliffe, Ohio

[22] Filed: Dec. 4, 1970

[21] Appl. No.: 95,352

Related U.S. Application Data

[63] Continuation-in-part of Ser. No. 15,241, Feb. 27, 1970, abandoned, which is a continuation-in-part of Ser. No. 831,227, June 6, 1969, abandoned.

[52] U.S. Cl. ..........................166/273, 166/275, 252/8.55 D
[51] Int. Cl. ......................................................E21b 43/22
[58] Field of Search..............166/275, 274, 273; 252/8.55 D; 260/29.6 SQ

[56] References Cited

UNITED STATES PATENTS

| | | | |
|---|---|---|---|
| 3,216,962 | 11/1965 | Gatza | 166/275 X |
| 3,230,201 | 1/1966 | Hart et al. | 260/77.5 |
| 3,282,337 | 11/1966 | Pye | 166/275 |
| 3,352,358 | 11/1967 | Williams, Jr. | 252/8.55 D |
| 3,399,725 | 9/1968 | Pye | 166/275 |
| 3,406,754 | 10/1968 | Gogarty | 166/273 |
| 3,467,187 | 9/1969 | Gogarty et al. | 166/273 |

*Primary Examiner*—Stephen J. Novosad
*Attorney*—Roger Y. K. Hsu, William H. Pittman and James W. Adams, Jr.

[57] ABSTRACT

Polymers of N-sulfohydrocarbon-substituted acrylamides, especially 2-acrylamido-2-methylpropanesulfonic acid, are useful for controlling the viscosity of aqueous media used in water-flooding operations for secondary petroleum recovery. The preferred polymers are homopolymers and copolymers with acrylic acid or acrylamides.

16 Claims, No Drawings

SECONDARY OIL RECOVERY METHOD USING N-SULFOHYDROCARBON-SUBSTITUTED ACRYLAMIDE POLYMERS AS VISCOSITY INCREASING AGENTS

REFERENCE TO RELATED APPLICATIONS

This application is a Continuation-in-Part of copending application Ser. No. 15,241, filed Feb. 27, 1970, now abandoned, which in turn is a Continuation-in-Part of application Ser. No. 831,227, filed June 6, 1969, now abandoned.

This invention relates to methods for secondary recovery of petroleum by water-flooding techniques. More particularly, it relates to an improvement in a method for recovering petroleum from a subterranean petroleum-bearing deposit which comprises injecting viscous water into the area of said deposit through at least one input well, thereby causing said petroleum to flow from said area for collection through at least one output well; said improvement comprising controlling the viscosity of said water by dissolving therein a minor amount of a water-soluble polymer containing at least about 5 percent by weight of repeating units of the formula

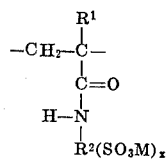

wherein $R^1$ is hydrogen or a lower alkyl or substituted lower alkyl radical, $R^2$ is a divalent or trivalent hydrocarbon or substituted hydrocarbon radical, M is hydrogen or one equivalent of a cation, and $x$ is 1 or 2.

The water-flooding method of secondary oil recovery has been in use for some time. As will readily be appreciated, it is chiefly of importance when the natural production of a well has ceased — that is, when petroleum can no longer be pumped from the well economically, but when there is enough petroleum remaining in the underlying rock formation to be worth recovering if an economical method can be found. The term "secondary recovery", as used herein, refers to all petroleum recovery operations used in such areas when spontaneous production of the well can no longer be effected. It includes what is sometimes known in the industry as "tertiary recovery", which is a later stage which begins when the oil reservoir is substantially "flooded out" and a large amount of water may be produced before any oil is recovered. Thus, while primary recovery is appropriate only when a well spontaneously flows, secondary recovery begins when primary recovery is no longer feasible and continues for as long as there is any petroleum remaining in the well which can be economically or feasibly removed.

Briefly described, the water-flooding method of secondary recovery begins with the drilling of a plurality of wells in the petroleum-bearing area. Frequently, a number of wells are drilled on the circumference of a circle and a final well is drilled in the center. In the simplest recovery method, water is then pumped into one or more of the wells, typically the ones on the circumference (sometimes referred to hereinafter as "injection wells"), under high pressure and forced through the petroleum-bearing formations, usually porous rock strata. The petroleum remaining in the strata is forced out by the oncoming water and removed through the output well, usually the one at the center of the circle.

Recovery of this method is, of course, facilitated if the mobility of the petroleum relative to the water is at a maximum. This is frequently accomplished by increasing the viscosity of the aqueous medium and decreasing the viscosity of the petroleum, by the addition of suitable chemical agents. Thus, a thickener is ordinarily added to the water while a thinning agent may be charged into the petroleum.

In a more sophisticated recovery method, the first material pumped into the injection wells is a "slug" of a micellar solution comprising water, oil and a surfactant. The slug is driven by a subsequently injected portion of a mobility buffer comprising water and a minor amount of a viscosity-controlling agent, usually a thickener as mentioned hereinabove, dissolved therein. The buffer is finally driven by untreated water, injected last. This method is described in somewhat more detail in an article on page 41 of World Oil for Feb. 1, 1970, as well as in many U.S. patents.

The requisite properties for viscosity-controlling agents and thickeners to be used in water-flooding are such that very few water-soluble polymers are useful for this purpose. In the first place, from a purely economic standpoint the polymer should be cheap and effective as a thickener at very low concentrations, usually on the order of 100–1,000 parts per million. In the second place, it should be compatible with salts such as sodium chloride and provide viscosity control in the presence as well as in the absence of such salts, since natural or mineral-containing waters are often used instead of pure water for water-flooding; this is no mean feat since the presence of salts in a thickened aqueous composition usually materially decreases its viscosity. In the third place, the polymer should be of very high molecular weight (preferably above about 1,000,000 and desirably above 1,500,000) and yet substantially free of cross-linking and should not have an excessive tendency to "plug" the oil reservoir — that is, to clog the pores of the rock and minimize the flow rate therethrough. In the fourth place, it should be resistant to shear stresses caused by flow through porous media, so as not to break down and cause an irreversible loss in viscosity. In the fifth place, it should have an optimum "resistance factor". The resistance factor is the ratio of the permeability of the rock core before flooding to its permeability after flooding. As it increases, the effectiveness of the thickener in the recovery operation first increases, but then drops off and the "plugging" effect becomes excessive.

Various classes of synthetic water-soluble polymers have been used as viscosity-controlling agents for water-flooding operations. Typical among these are the water-soluble sulfonated aromatic polymers, such as sulfonated polystyrenes, and poly-acrylamides, which may or may not be partially hydrolyzed. The chief difficulty with the sulfonated polystyrenes is that they cannot economically be obtained in sufficiently high molecular weight, by ordinary chemical techniques, to provide the necessary viscosity control. Acrylamide, on the other hand, is easily polymerized to the desired molecular weight of 1,000,000 or greater, but its solutions nevertheless do not have effective viscosities as high as is desired for use in rock strata.

A principal object of the present invention, therefore, is to produce viscosity control agents for water-flooding operations which are highly effective at low concentrations.

A further object is to provide an economical "family" of viscosity control agents which are highly effective at low concentrations in rock strata of various porosities.

Another object is to provide thickeners which may be used in mobility buffers for use with micellar solutions in secondary recovery.

Still another object is to provide an improved water-flooding technique which is susceptible of wide use for secondary oil recovery.

Other objects will in part be obvious and will in part appear hereinafter.

In brief, the method described herein involves the use as viscosity-controlling agents of water-soluble polymers of N-sulfohydrocarbon-substituted acrylamides. These acrylamides are represented by the above formula in which $R^1$ is hydrogen or a lower (as defined hereinafter) alkyl radical and $R^2$ is a divalent or trivalent hydrocarbon radical. As used herein, the term "hydrocarbon radical" includes aliphatic, cycloaliphatic and aromatic (including aliphatic- and cycloaliphatic-substituted aromatic and aromatic-substituted aliphatic and cycloaliphatic) radicals. It also includes cyclic radicals wherein the ring is completed through another portion of the molecule; that is, any two indicated substituents may together form a cyclic hydrocarbon radical.

The following are illustrative of divalent hydrocarbon radicals within the scope of this invention. Where a named radical has several isomeric forms (e.g., butylene), all such forms are included.

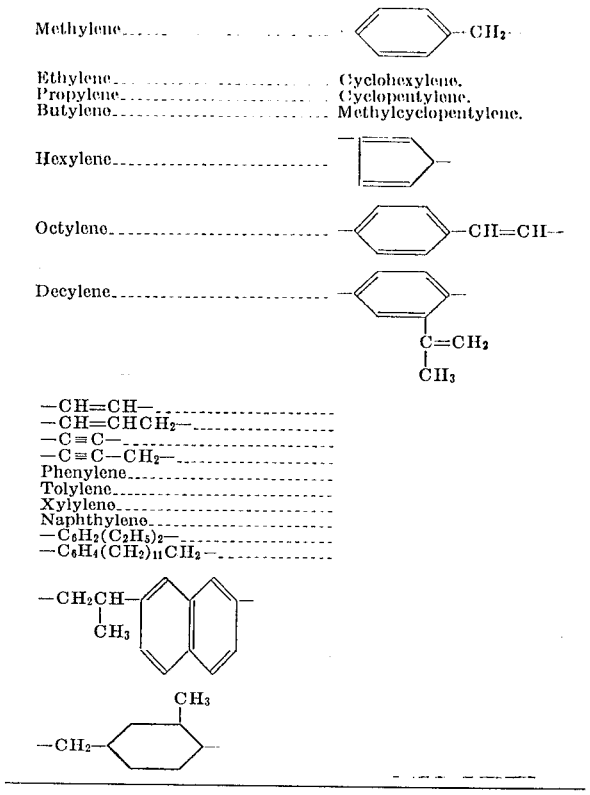

Trivalent radicals are similar to the above but have an additional hydrogen atom abstracted.

Many obvious variations of these radicals will be apparent to those skilled in the art and are included within the scope of the invention.

Substituted hydrocarbon, alkyl, aryl, alkylene, arylene, etc., radicals are considered fully equivalent to the hydrocarbon, alkyl, aryl, alkylene, arylene, etc., radicals and to be part of this invention. By "substituted" is meant radicals containing substituents which do not alter significantly the character of reactivity of the radical. Examples are:
  Halide (fluoride, chloride, bromide, iodide)
  Hydroxy
  Ether (especially lower alkoxy)
  Keto
  Carboxy
  Ester (especially lower carbalkoxy)
  Aminoacyl (amide)
  Amino
  Nitro
  Cyano
  Thioether
  Sulfoxy
  Sulfone
  Sulfonic acid ester, amide, etc.

In general, no more than about three such substituent groups will be present for each 10 carbon atoms in the radical.

Preferably, the hydrocarbon or substituted hydrocarbon radicals in the compounds of this invention are free from ethylenic and acetylenic unsaturation and have no more than about 30 carbon atoms, desirably no more than about 12 carbon atoms. A particular preference is expressed for lower hydrocarbon radicals, the word "lower" denoting radicals containing up to seven carbon atoms. Still more preferably, they are lower alkylene or arylene radicals, most often alkylene.

In the formula, $R^1$ is hydrogen or lower alkyl but is preferably hydrogen or methyl, usually hydrogen. $R^2$ may be any divalent or trivalent hydrocarbon radical, preferably lower alkylene or arylene and usually lower alkylene. In a preferred embodiment of this invention, $R^2$ is

wherein $R^3$ is hydrogen or a lower alkyl radical, $R^4$ is a lower alkyl radical and the sulfonic acid group is attached to the unsubstituted methylene carbon. These polymers may be obtained by the polymerization, either alone or in combination with other polymerizable vinyl monomers, of the corresponding monomeric N-sulfohydrocarbon-substituted acrylamides of which the following are examples.

2-Acrylamidoethanesulfonic acid $$CH_2 = CHCONHCH_2CH_2SO_3H$$

2-Acrylamidopropanesulfonic acid

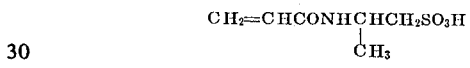

2-Acrylamido-2-methylpropanesulfonic acid

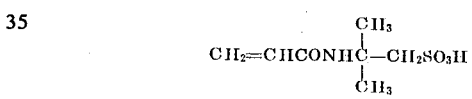

3-Methacrylamidopropansulfonic acid

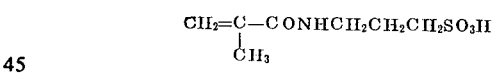

4-Methacrylamidocyclohexanesulfonic acid

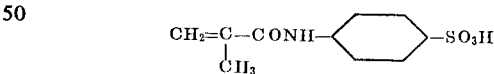

2-Acrylamido-2-phenylethanesulfonic acid

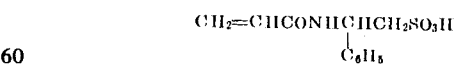

2-Acrylamido-2-phenylpropanesulfonic acid

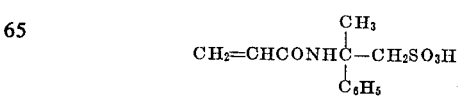

4-Acrylamidobenzenesulfonic acid

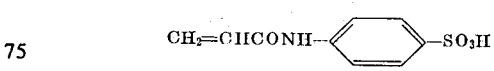

5-Acrylamidobenzene-1,3-disulfonic acid

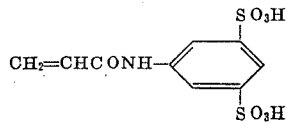

From the standpoint of economy, ease of preparation and polymerization, and effectiveness, the most desirable viscosity control agents are polymers of 2-acrylamido-2-methyl-propane-sulfonic acid or its salts, usually alkali metal or ammonium salts and preferably sodium or potassium salts. The term "N-sulfohydrocarbon-substituted acrylamide" when used hereinafter will refer to this class of compounds generally, with the understanding that the above-named compound is especially preferred.

The N-sulfohydrocarbon-substituted acrylamide polymers used in the method of this invention may be homopolymers or copolymers, the latter containing at least about 5 percent by weight, and preferably at least about 50 percent, of N-sulfohydrocarbon-substituted acrylamide units. The identity of the other monomer or monomers is not critical except that the polymer must be water-soluble. The most useful polymers are homopolymers and copolymers with 5–95 percent, preferably 5–50 percent and most desirably 5–30 percent, of an acrylic monomer such as acrylic or methacrylic acid or a salt or amide thereof, notably acrylamide (which may be partially hydrolyzed), methacrylamide, N-methylacrylamide, N-(1,1-dimethyl-3-oxobutyl)acrylamide (diacetone acrylamide) and the like.

The polymers may be prepared in bulk, solution, suspension or emulsion. Since they must be water-soluble, it is frequently convenient to prepare them in aqueous solution. Another method, which has been found particularly useful, is to prepare an aqueous solution of the monomer or monomers and suspend the same in a water-immiscible solvent such as an aliphatic or aromatic hydrocarbon or halogenated hydrocarbon. Generally, the sulfonic acid monomer is converted to its metal salt prior to polymerization by means of a suitable alkaline reagent. When polymerization is effected in suspension, ordinary suspension agents known to those skilled in the art are used.

The polymerization may be promoted by typical initiators used in aqueous systems, especially peroxides, persulfates, persulfate-bisulfite and the like. It has been found that the alkali metal salts, especially the sodium salt, of 2-acrylamido-2-methylpropanesulfonic acid may frequently be polymerized in the absence of polymerization initiator.

It is sometimes advantageous to carry out the polymerization in the presence of a small amount of chain transfer agent, which tends to cause formation of a polymer with more uniformity in molecular weight than is otherwise produced. Suitable chain transfer agents are known to those skilled in the art.

For oil recovery purposes, polymers of very high molecular weight are required. The polymers described herein have such high molecular weights as evidenced by their inherent viscosities, which are usually about 7.5 or higher (measured on a solution of 0.25 gram of polymer per 100 ml. of 3 percent (by weight) aqueous sodium chloride solution, at 30°C.).

The following examples illustrate the preparation of polymers which may be used in the method of this invention.

EXAMPLE 1

To a solution of 90.1 parts (0.437 mole) of 2-acryl-amido-2-methylpropanesulfonic acid in 100 parts of water in a nitrogen atmosphere is added, with stirring, 23.1 parts (0.437 mole) of sodium carbonate. After 5 minutes of stirring at room temperature, the solution becomes very viscous and an exothermic reaction begins. After 10 minutes, the mixture has set into a clear gel.

EXAMPLE 2

An ammonium hydroxide solution is prepared from 28.5 parts of concentrated ammonia solution and 75 parts of water. This solution is purged with nitrogen and 92.3 parts of 2-acrylamido-2-methylpropanesulfonic acid is added. The pH of the mixture is adjusted to about 4 by adding additional sulfonic acid, and 0.0015 part each of sodium metabisulfite and ammonium persulfate are added. The solution thickens as polymerization takes place exothermically, yielding the desired ammonium salt of a homopolymer of 2-acrylamido-2-methylpropanesulfonic acid which is partially dried at 60°–70 °C. under vacuum and pulverized, after which drying is completed. The polymer has an inherent viscosity (0.25 g. in 100 ml. of 3 percent (by weight) aqueous sodium chloride solution, 30°C.) of 7.46.

EXAMPLE 3

By a procedure similar to that of Example 2, a copolymer containing 80 percent (by weight) sodium 2-acrylamido-2-methylpropanesulfonate and 20 percent sodium acrylate is prepared in aqueous solution, using an ammonium persulfate-sodium metabisulfite polymerization initiator. The product has an inherent viscosity (measured as in Example 2) of 7.44.

EXAMPLE 4

By a procedure similar to that of Example 2, a copolymer containing 95 percent (by weight) sodium 2-acrylamido-2-methylpropanesulfonate and 5 percent acrylamide is prepared. It has an inherent viscosity (measured as in Example 2) of 9.03.

EXAMPLE 5

By a procedure similar to that of Example 2, a copolymer containing 90 percent sodium 2-acrylamido-2-methylpropanesulfonate and 10 percent acrylamide is prepared.

EXAMPLE 6

A copolymer containing 85% sodium 2-acrylamido-2-methylpropanesulfonate and 15 percent acrylamide is prepared, using substantially the procedure of Example 2.

EXAMPLE 7

A mixture of 67.8 parts of 2-acrylamido-2-methylpropanesulfonic acid and 25 parts of diacetone acrylamide in 100 parts of water is neutralized with sodium carbonate and polymerized, using a sodium metabisulfite-ammonium persulfate catalyst. The product is a 75:25 copolymer of the sulfonic acid and diacetone acrylamide.

EXAMPLE 8

2-Acrylamido-2-methylpropanesulfonic acid, 45.2 grams (0.218 mole), is neutralized with sodium hydroxide in 50 ml. of water. The solution of the sodium salt is transferred to a resin flask and 0.5 gram of sodium lauryl sulfate is added. The mixture is stirred for 5 minutes and purged with nitrogen, after which 0.001 gram each of ammonium persulfate and sodium metabisulfite are added. Stirring is continued for a few seconds, and then 500 grams of benzene is added and the mixture is heated at 50° C. as polymerization takes place. The mixture is then cooled to room temperature and the benzene is decanted.

The polymer thus formed is washed twice with acetone, dried under vacuum at 65° C. and pulverized. Drying of the pulverized sample is continued; there is obtained the desired homopolymer having an inherent viscosity (measured as in Example 2) of 8.20.

EXAMPLE 9

The procedure of Example 8 is repeated, except that 0.00005 gram of mercaptosuccinic acid (a chain transfer agent) is added at the same time as the ammonium persulfate and sodium bisulfite. Most of the water is removed by azeotropic distillation before drying. The resulting homopolymer has an inherent viscosity (measured as in Example 2) of 8.29.

EXAMPLE 10

The procedure of Example 9 is repeated, except that 30 parts of water and 1 part of sodium lauryl sulfate are used and the sodium metabisulfite and mercaptosuccinic acid are omitted. The resulting polymer has an inherent viscosity (measured as in Example 2) of 8.73.

EXAMPLE 11

Following the procedure of Example 8, a copolymer containing 95 percent by weight sodium 2-acrylamido-2-methylpropanesulfonate and 5 percent diacetone acrylamide is prepared. It has an inherent viscosity (measured as in Example 2) of 8.44.

The viscosities of aqueous solutions of a number of polymers used in the method of this invention are given in Table I.

TABLE I

| Ex. | Polymer concentration, ppm. | Speed, rpm. | Brookfield viscosity, cp. |
| --- | --- | --- | --- |
| 1 | 1,000 | 2 | 435 |
| 4 |  |  | 255 |
| 10 |  |  | 129 |
| 20 |  |  | 85 |
|  | 500 | 2 | 220 |
| 4 |  |  | 127 |
| 10 |  |  | 66 |
| 20 |  |  | 46 |
| 2 | 1,000 | 6 | 412 |
| 3 | 1,000 | 6 | 515 |
| 4 | 1,000 | 6 | 432 |
| 5 | 10,000 | 2 | 15,400 |
| 20 |  |  | 2,620 |
| 6 | 10,000 | 2 | 15,920 |
| 20 |  |  | 3,725 |
| 7 | 1,000 | 2 | 850 |
| 4 |  |  | 522 |
| 10 |  |  | 276 |
| 20 |  |  | 173 |
|  | 500 | 2 | 430 |
| 4 |  |  | 265 |
| 10 |  |  | 137 |
| 20 |  |  | 87 |

The relative resistance of the present polymers to viscosity loss in the presence of sodium chloride is shown by the results in Table II, which demonstrate that aqueous solutions with a polymer concentration of 1,000 ppm. gives Brookfield viscosities of 30 cp. of greater at 6 rpm. even when 500 ppm. sodium chloride is present.

TABLE II

| Ex. | Polymer concentration, ppm. | NaCl concentration, ppm. | Brookfield viscosity, cp. at 6 rpm. |
| --- | --- | --- | --- |
| 2 | 1000 | 500 | 35.3 |
| 3 | 1000 | 500 | 37.2 |
| 4 | 1000 | 500 | 46.2 |

Likewise, the results in Table III show that the polymer of Example 7 (at 1000 ppm.) is effective in brine solutions.

TABLE III

| NaCl concentration, ppm. | Brookfield viscosity, cps. | | | |
| --- | --- | --- | --- | --- |
|  | 2 rpm. | 4 rpm. | 10 rpm. | 20 rpm. |
| 0 | 840 | 527.5 | 281 | 176.5 |
| 500 | 70 | 55 | 41 | 36 |

The behavior of aqueous solutions of viscosity-controlling polymers under actual oil recovery conditions may be approximated by tests run on rock cores chosen to simulate the rock in petroleum-bearing areas. Three parameters are determined by measurement and/or calculation from such core tests: resistance factor, mobility and effective viscosity.

The resistance factor of the polymer is the ratio of "initial permeability" to "flushed permeability" of the rock core. The most desirable resistance factor values are between about 5 and 10 but will vary somewhat according to the nature, especially the porosity, of the rock core being flooded. For general use, a resistance factor of about 7–8 is preferred. However, higher resistance factors may be desired in highly porous rock formations and lower resistance factors in less porous formations. Thus, it is useful to have a "family" of polymers with some variations in resistance factor.

The mobility of the polymer solutions is inversely proportional to the resistance factor and is also dependent on other variables. The suitability of a polymer for water-flooding is usually proportional to its mobility; that is, the lower the mobility the better the polymer is as a viscosity-controlling agent in such operations.

The effective viscosity of the polymer solution is the reciprocal of the product of mobility and resistance factor. In general, the higher the effective viscosity the more suitable the polymer is as a viscosity-controlling agent. The usual range is illustrated by the previously known partially hydrolyzed polyacrylamide thickeners, whose effective viscosity is usually about 5–7 cps.

The mobility, effective viscosity and resistance factor of several polymers of 2-acrylamido-2-methylpropanesulfonic acid salts, at a concentration of 700 ppm., is given in Table IV. These figures are those determined at the "rear" of the rock core; that is, at the point where the solution is removed. Similar values found at the "front" of the core are chiefly of interest with reference to "filtering" of solids out of solution.

TABLE IV

| Ex. | Mobility, cp.$^{-1}$ | Resistance Factor | Effective viscosity, cp. |
| --- | --- | --- | --- |
| 2 | 0.0134 | 7.9 | 9.4 |
| 3 | 0.0266 | 7.0 | 5.4 |
| 4 | 0.0134 | 7.9 | 9.4 |
| 8 | 0.0098 | 8.7 | 11.6 |
| 9 | 0.0129 | 6.9 | 11.2 |
| 10 | 0.0144 | 6.7 | 10.3 |

It will be seen from the data in Table IV that the polymers used in the method of this invention have effective viscosities ranging from average to very high, and have resistance factors varying over a fairly wide range. They also have very low mobilities. Thus, these polymers are extremely well adapted for use as a "family" of viscosity control agents in secondary oil recovery operations by water-flooding. They may be used in either the drive water or the mobility buffer used in conjunction with a micellar solution.

What is claimed is:

1. In a method for recovering petroleum from a sub-terranean petroleum-bearing deposit which comprises injecting viscous water into the area of said deposit through at least one input well, thereby causing said petroleum to flow from said area for collection through at least one input well, the improvement which comprises controlling the viscosity of said water by dissolving therein a minor amount of a water-soluble polymer containing at least 5 percent by weight of repeating units of the formula

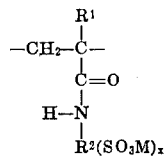

wherein $R^1$ is hydrogen or a lower alkyl or substituted lower alkyl radical, $R^2$ is a divalent or trivalent hydrocarbon or substituted hydrocarbon radical, M is hydrogen or one equivalent of a cation, and $x$ is 1 or 2.

2. A method according to claim 1 wherein $R^2$ is a lower alkylene or arylene radical and x is 1.

3. A method according to claim 2 wherein $R^2$ is

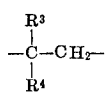

$R^3$ is hydrogen or a lower alkyl radical, $R^4$ is a lower alkyl radical, and the sulfonic acid group is attached to the unsubstituted methylene carbon of $R^2$.

4. A method according to claim 3 wherein $R^1$ is hydrogen, each of $R^3$ and $R^4$ is methyl, and M is an alkali metal or ammonium ion.

5. A method according to claim 4 wherein the polymer is a homopolymer.

6. A method according to claim 4 wherein the polymer is a copolymer with 5–30 percent by weight of acrylic or methacrylic acid or a salt or amide thereof.

7. A method according to claim 6 wherein the comonomer is acrylamide.

8. In a method for recovering petroleum from a subterranean petroleum-bearing deposit which comprises injecting a micellar solution comprising water, oil and a surfactant into the area of said deposit through at least one input well, subsequently injecting a mobility buffer comprising water and a minor amount of a viscosity-controlling agent dissolved therein, and finally injecting water to drive said mobility buffer and micellar solution, therefore causing said petroleum to flow from said area for collection through at least one output well, the improvement whereby said viscosity-controlling agent is a water-soluble polymer containing at least 5 percent by weight of repeating units of the formula

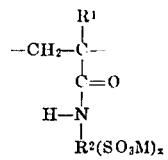

wherein $R^1$ is hydrogen or a lower alkyl or substituted lower alkyl radical, $R^2$ is a divalent or trivalent hydrocarbon or substituted hydrocarbon radical, M is hydrogen or one equivalent of a cation, and $x$ is 1 or 2.

9. A method according to claim 8 wherein $R^2$ is a lower alkylene or arylene radical and $x$ is 1.

10. A method according to claim 9 wherein $R^2$ is

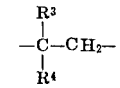

$R^3$ is hydrogen or a lower alkyl radical, $R^4$ is a lower alkyl radical, and the sulfonic acid group is attached to the unsubstituted methylene carbon of $R^2$.

11. A method according to claim 10 wherein $R^1$ is hydrogen, each of $R^3$ and $R^4$ is methyl, and M is an alkali metal or ammonium ion.

12. A method according to claim 11 wherein the polymer is a homopolymer.

13. A method according to claim 11 wherein the polymer is a copolymer with 5–30 percent by weight of acrylic or methacrylic acid or a salt or amide thereof.

14. A method according to claim 13 wherein the comonomer is acrylamide.

15. A method according to claim 3 wherein each of $R^1$ and $R^3$ is hydrogen, $R^4$ is methyl, and M is an alkali metal or ammonium ion.

16. A method according to claim 10 wherein each of $R^1$ and $R^3$ is hydrogen, $R^4$ is methyl, and M is an alkali metal or ammonium ion.

* * * * *

UNITED STATES PATENT OFFICE
CERTIFICATE OF CORRECTION

Sheet 1

Patent No. 3,679,000     Dated July 25, 1972

Inventor(s) Paul Richard Kaufman

It is certified that error appears in the above-identified patent and that said Letters Patent are hereby corrected as shown below:

Column 7, lines 24-50, Table I should read as follows:

| Example | Polymer concentration, ppm. | Speed, rpm. | Brookfield viscosity, cp. |
|---|---|---|---|
| 1 | 1,000 | 2 | 435 |
|   |       | 4 | 255 |
|   |       | 10 | 129 |
|   |       | 20 | 85 |
|   | 500   | 2 | 220 |
|   |       | 4 | 127 |
|   |       | 10 | 66 |
|   |       | 20 | 46 |
| 2 | 1,000 | 6 | 412 |
| 3 | 1,000 | 6 | 515 |
| 4 | 1,000 | 6 | 432 |
| 5 | 10,000 | 2 | 15,400 |
|   |        | 20 | 2,620 |
| 6 | 10,000 | 2 | 15,920 |
|   |        | 20 | 3,725 |
| 7 | 1,000 | 2 | 850 |
|   |       | 4 | 522 |
|   |       | 10 | 276 |
|   |       | 20 | 173 |
|   | 500   | 2 | 430 |
|   |       | 4 | 265 |
|   |       | 10 | 137 |
|   |       | 20 | 87 |

FORM PO-1050 (10-69)

UNITED STATES PATENT OFFICE
CERTIFICATE OF CORRECTION

Patent No. 3,679,000             Dated July 25, 1972

Inventor(s) Paul Richard Kaufman

It is certified that error appears in the above-identified patent and that said Letters Patent are hereby corrected as shown below:

Column 7, lines 60-63, the headings to Table II should read as follows:

| Example | Polymer concentration, ppm. | NaCl concentration, ppm. | Brookfield viscosity cp. at 6 rpm. |
|---|---|---|---|

Column 8, lines 45-48, the headings to Table IV should read as follows:

| Example | Mobility, $cp.^{-1}$ | Resistance Factor | Effective viscosity, cp. |
|---|---|---|---|

Column 8, line 73, "input" (second occurrence in claim 1) should read --output--.

Signed and sealed this 29th day of May 1973.

(SEAL)
Attest:

EDWARD M. FLETCHER, JR.          ROBERT GOTTSCHALK
Attesting Officer                Commissioner of Patents